United States Patent [19]

Nohr et al.

[11] Patent Number: 5,114,646
[45] Date of Patent: May 19, 1992

[54] METHOD OF INCREASING THE DELAY PERIOD OF NONWOVEN WEBS HAVING DELAYED WETTABILITY

[75] Inventors: Ronald S. Nohr, Roswell; J. Gavin MacDonald, Decatur, both of Ga.

[73] Assignee: Kimberly-Clark Corporation, Neenah, Wis.

[21] Appl. No.: 488,344

[22] Filed: Mar. 2, 1990

Related U.S. Application Data

[63] Continuation-in-part of Ser. No. 408,812, Sep. 18, 1989, abandoned.

[51] Int. Cl.$^5$ ............................................. D01F 1/10
[52] U.S. Cl. .................................. 264/103; 264/211; 264/211.14
[58] Field of Search ........... 156/167; 264/211, 211.17, 264/103, 211.14

[56] References Cited

U.S. PATENT DOCUMENTS

| | | | |
|---|---|---|---|
| Re. 32,514 | 10/1987 | Steklenski | 524/32 |
| 3,360,421 | 12/1967 | Sands | 161/63 |
| 3,620,821 | 11/1971 | Jones | 117/126 |
| 3,629,308 | 12/1971 | Bailey et al. | 260/448.2 |
| 3,766,115 | 10/1973 | Sands | 260/29.1 |
| 3,867,188 | 2/1975 | Campbell et al. | 117/138.8 |
| 3,929,509 | 12/1975 | Taskier | 136/146 |
| 3,972,759 | 8/1976 | Buntin | 156/167 |
| 3,973,068 | 8/1976 | Weber | 28/198 |
| 4,070,218 | 1/1978 | Weber | 156/167 |
| 4,105,569 | 8/1978 | Crossfield | 252/8.6 |
| 4,150,013 | 4/1979 | Pundrson | 260/42.26 |
| 4,426,203 | 1/1984 | Abel et al. | 8/138 |
| 4,444,563 | 4/1984 | Abel | 8/588 |
| 4,446,090 | 5/1984 | Lovgren et al. | 264/211 |
| 4,480,009 | 10/1984 | Berger | 428/447 |
| 4,499,149 | 2/1985 | Berger | 428/447 |
| 4,500,659 | 2/1985 | Kroupa et al. | 523/213 |
| 4,535,113 | 8/1985 | Foster et al. | 524/310 |
| 4,563,190 | 1/1986 | Topfl | 8/524 |
| 4,578,414 | 3/1986 | Sawyer et al. | 524/310 |
| 4,585,830 | 4/1986 | Sweet | 524/862 |
| 4,645,691 | 2/1987 | Ona et al. | 427/180 |
| 4,652,489 | 3/1987 | Crass et al. | 428/337 |
| 4,659,777 | 4/1987 | Riffle et al. | 525/100 |
| 4,672,005 | 6/1987 | Dyer | 428/474.4 |
| 4,689,362 | 8/1987 | Dexter | 524/266 |
| 4,698,388 | 10/1987 | Ohmura et al. | 525/88 |
| 4,745,142 | 5/1988 | Ohwaki et al. | 524/87 |
| 4,923,914 | 5/1990 | Nohr et al. | 524/99 |

FOREIGN PATENT DOCUMENTS 1049682 10/1979 Canada .
0071349A2 2/1982 European Pat. Off. .

OTHER PUBLICATIONS

A. J. Sabia and R. B. Metzler, *Nonwovens Ind.*, 14, 16 (1983).
Chem. Abstr., 84:91066z (1976).
Chem. Abstr., 77:89559z (1972).
R. H. Somani and M. T. Saw, *Macromolecules*, 14, 886 (1981).
S. N. Pandit et al., *Polym. Compos.*, 2, 68 (1981).
"SILWET® Surface Active Copolymers", Bulletin SUI-394A, 7/85-5M Union Carbide Corporation.
"Silicon Compounds Register and Review", Petrarch Systems Silanes and Silicones, pp. 253-300, Petrarch Systems.
"TEGOPREN® Silicone Surfactants-Products, Data, Information", Th. Goldschmidt AG.
"Surfactants at Th. Goldschmidt AG", Th. Goldschmidt AG.
"Goldschmidt informiert . . . ", Jan. 1982, Nr. 56, Mar. 1982, English Edition, Th. Goldschmidt AG.
"Goldschmidt informiert . . . ", Apr. 1984, No. 63, Dec. 1984, Functional Oligomers, Th. Goldschmidt AG.
"SILWET® Surfactants", Bulletin SC-877, P8-2538, 2/88-10M, Union Carbide Corporation.

Primary Examiner—Hubert C. Lorin
Attorney, Agent, or Firm—William E. Maycock

[57] ABSTRACT

A method comprising melting a mixture of at least one thermoplastic polyolefin and at least one additive having the general formula,

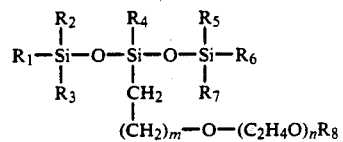

and extruding the resulting melt through a die at a shear rate of from about 50 to about 30,000 sec$^{-1}$ and a throughput of no more than about 5.4 kg/cm/hour, in which:

(A) $R_1$-$R_7$ are independently selected monovalent $C_1$-$C_3$ alkyl groups;
(B) $R_8$ is hydrogen or a monovalent $C_1$-$C_3$ alkyl group;
(C) m represents an integer of from 0 to about 5
(D) n represents an integer of from 3 to about 8;
(E) the additive has a molecular weight of from about 350 to about 700;
(F) the additive has a polydispersity of from about 1.0 to about 1.3; and
(G) the additive is present in an amount of from about 0.5 to about 1.75 percent by weight, based on the amount of thermoplastic polyolefin, which amount, if homogeneously distributed throughout the polyolefin, is not sufficient to render the polyolefin wettable by water;

the improvement which comprises including in the mixture of at least one thermoplastic polyolefin and at least one additive from about 0.1 to about 6 percent by weight, based on the amount of said thermoplastic polyolefin, of at least one material having the capacity to increase the delay period for up to about two weeks.

5 Claims, No Drawings

METHOD OF INCREASING THE DELAY PERIOD OF NONWOVEN WEBS HAVING DELAYED WETTABILITY

CROSS-REFERENCE TO RELATED APPLICATION

A method of preparing a nonwoven web which is not wettable by water immediately after its formation but which becomes wettable within about 24 hours thereafter without any post-formation treatment is described and claimed in application Ser. No. 07/485,922, entitled METHOD OF PREPARING A NONWOVEN WEB HAVING DELAYED WETTABILITY, filed Feb. 27, 1990 in the names of Ronald S. Nohr and J. Gavin MacDonald. The application is a continuation-in-part of application Ser. No. 07/408,812, filed Sept. 18, 1989.

BACKGROUND OF THE INVENTION

The present invention relates to a method of preparing a nonwoven web having delayed wettability. More particularly, the present invention relates to a method of increasing the delay period of a nonwoven web which is not wettable by water upon its formation but which becomes wettable thereafter without any post-formation treatment.

Cross-referenced application Ser. No. 07/485,922 describes a method of preparing a nonwoven web which is not wettable by water immediately after its formation but which becomes wettable within about 24 hours thereafter without any post-formation treatment. The method comprises melting a mixture of at least one thermoplastic polyolefin and at least one additive having the general formula,

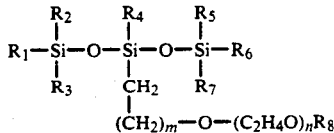

and extruding the resulting melt through a die at a shear rate of from about 50 to about 30,000 sec$^{-1}$ and a throughput of no more than about 5.4 kg/cm/hour, in which:
(A) $R_1$-$R_7$ are independently selected monovalent $C_1$-$C_3$ alkyl groups;
(B) $R_8$ is hydrogen or a monovalent $C_1$-$C_3$ alkyl group;
(C) m represents an integer of from 0 to about 5
(D) n represents an integer of from 3 to about 8;
(E) said additive has a molecular weight of from about 350 to about 700;
(F) said additive has a polydispersity of from about 1.0 to about 1.3; and
(G) said additive is present in an amount of from about 0.5 to about 1.75 percent by weight, based on the amount of thermoplastic polymer, which amount, if homogeneously distributed throughout the polyolefin, is not sufficient to render the polyolefin wettable by water.

It was discovered that the inclusion of a phthalocyanine dye in the composition to be melt-processed resulted in a nonwoven web having a significantly increased delay period relative to a composition in which the phthalocyanine dye was absent. Thus, it is evident that materials exist which have the unusual and unexpected capacity to increase the delay period in nonwoven webs prepared in accordance with the method described in application Ser. No. 07/485,922.

SUMMARY OF THE INVENTION

It therefore is an object of the present invention to provide a method of increasing the delay period of a nonwoven web having delayed wettability.

This and other objects will be apparent to those having ordinary skill in the art from a consideration of the specification and claims which follow.

Accordingly, the present invention provides, in a method for preparing a nonwoven web having delayed wettability, in that said web is not wettable by water upon its formation but becomes wettable thereafter without any post-formation treatment, which method comprises melting a mixture of at least one thermoplastic polyolefin and at least one additive having the general formula,

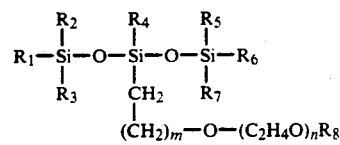

and extruding the resulting melt through a die at a shear rate of from about 50 to about 30,000 sec$^{-1}$ and a throughput of no more than about 5.4 kg/cm/hour, in which:
(A) $R_1$-$R_7$ are independently selected monovalent $C_1$-$C_3$ alkyl groups;
(B) $R_8$ is hydrogen or a monovalent $C_1$-$C_3$ alkyl group;
(C) m represents an integer of from 0 to about 5
(D) n represents an integer of from 3 to about 8;
(E) said additive has a molecular weight of from about 350 to about 700;
(F) said additive has a polydispersity of from about 1.0 to about 1.3; and
(G) said additive is present in an amount of from about 0.5 to about 1.75 percent by weight, based on the amount of thermoplastic polyolefin, which amount, if homogeneously distributed throughout the polyolefin, is not sufficient to render the polyolefin wettable by water;

the improvement which comprises including in said mixture of at least one thermoplastic polyolefin and at least one additive from about 0.1 to about 6 percent by weight, based on the amount of said thermoplastic polyolefin, of at least one material having the capacity to increase the delay period for up to about two weeks.

In preferred embodiments, the polyolefin is polypropylene. The preferred material having the capacity to increase the delay period is a phthalocyanine dye.

DETAILED DESCRIPTION OF THE INVENTION

As used herein, the term "delayed wettability" as applied to a nonwoven web means that the web is not wettable by water upon its formation but becomes wettable thereafter without any post-formation treatment. In the method of application Ser. No. 07/485,922, the period of delay typically was from about one minute to about 24 hours. With the method of the present invention, the delay period can be extended for up to about two weeks.

In general, the term "thermoplastic polyolefin" is used herein to mean any thermoplastic polyolefin which can be used for the preparation of nonwoven webs. Examples of thermoplastic polyolefins include polyethylene, polypropylene, poly(1-butene), poly(2-butene), poly(1-pentene), poly(2-pentene), poly(3-methyl-1-pentene),poly(4-methyl-1-pentene), 1,2-poly-1,3-butadiene, 1,4-poly-1,3-butadiene, polyisoprene, polychloroprene, polyacrylonitrile, poly(vinyl acetate), poly-(vinylidene chloride), polystyrene, and the like.

The preferred polyolefins are those which contain only hydrogen and carbon atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. In addition, such term is meant to include blends of two or more polyolefins and random and block copolymers prepared from two or more different unsaturated monomers. Because of their commercial importance, the most preferred polyolefins are polyethylene and polypropylene.

The additive which is employed in the method of the present invention is a trisiloxane having the formula,

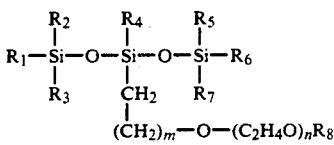

in which:
- (A) $R_1$-$R_7$ are independently selected monovalent $C_1$-$C_3$ alkyl groups;
- (B) $R_8$ is hydrogen or a monovalent $C_1$-$C_3$ alkyl group;
- (C) m represents an integer of from 0 to about 5
- (D) n represents an integer of from 3 to about 8;
- (E) said additive has a molecular weight of from about 350 to about 700; and
- (F) said additive has a polydispersity of from about 1.0 to about 1.3.

In preferred embodiments, each of $R_1$-$R_7$ is a methyl group. In other preferred embodiments, $R_8$ is either hydrogen or a methyl group. In yet other preferred embodiments, m is either 1 or 2, but most preferably is 2. In still other preferred embodiments, n is either 7 or 8.

While the additive molecular weight can vary from about 350 to about 700, it preferably will not exceed about 600.

As noted, the polydispersity of the additive will be in the range of from about 1.0 to about 1.3. As used herein, the term "polydispersity" refers to the ratio of the weightaverage molecular weight to the number-average molecular weight. Preferably, the polydispersity of the additive will be in the range of from 1.0 to about 1.2. More preferably, the polydispersity of the additive will be in the range of from 1.0 to about 1.1.

While the additive can be either a liquid or a solid, a liquid is preferred. It also is preferred that a liquid additive have a surface tension which is less than that of virgin polymer; the lower surface tension assures that the additive will be more likely to completely "wet" or cover the surface of the fiber or film as the segregation process proceeds to completion, especially under conditions favoring a large concentration differential.

In general, the additive will be present in an amount of from about 0.5 to about 1.75 percent by weight, based on the amount of thermoplastic polyolefin. Preferably, the amount of additive will be in the range of from about 0.5 to about 1.0 percent by weight. These additive levels are not sufficient to impart hydrophilicity to the polyolefin if the additive is distributed homogeneously or uniformly throughout the polymer. If additive levels greater than about 1.75 percent by weight are employed, the resulting fibers are immediately wettable and the web integrity and deposition problems mentioned earlier often are observed.

It may be noted at this point that optimum additive levels are in part dependent upon the nonwoven process employed. For example, if a given additive were employed at the same level in both a meltblowing process and a spunbonding process, the delay time for the meltblown web is likely to be shorter than that for the spunbonded web. Thus, in general, preferred additive levels for meltblowing processes typically are a little lower than the preferred additive levels for spunbonding processes.

The term "additive" is used broadly herein to encompass the use of more than one additive in a given composition, i.e., a mixture of two or more additives. Moreover, it should be appreciated by those having ordinary skill in the art that additives as defined herein typically are not available as pure compounds. Thus, the presence of impurities or related materials which may not come within the general formula given above for the additives does remove any given material from the spirit and scope of the present invention. For example, the preparation of additives useful in the present invention typically results in the presence of free polyether. The presence of such free polyether is not known to have deleterious effects, although, in order to achieve a desired delay time with a given additive, it may be necessary to increase the amount of additive to compensate for the presence of free polyether. As a practical matter, it is preferred that the amount of free polyether present in any additive be no more than about 30 percent by weight. More preferably, the amount of free polyether present in an additive will be no more than about 20 percent by weight.

In addition to the additive, the thermoplastic polyolefin to be melt-processed to form a nonwoven web also includes a material having the capacity to increase the delay period for up to about two weeks. Such material will be present in the thermoplastic polyolefin at a level of from about 0.1 to about 6 percent by weight, based on the amount of thermoplastic polyolefin.

Such material can be any material or compound having the capacity to increase the delay period for up to about two weeks. Preferably, such material will be a phthalocyanine dye having a tetrabenzoporphyrazine nucleus which can be substituted or unsubstituted. In addition, the tetrabenzoporphyrazine can be metallized, such as with copper to form a copper phthalocyanine.

When the composition of the present invention is meltextruded to give a nonwoven web, the additive moves to the surfaces of the newly formed fibers as described in U.S. Pat. No. 4,923,914, entitled SURFACE-SEGREGATABLE, MELT-EXTRUDABLE THERMOPLASTIC COMPOSITION, filed on Apr. 14, 1988 in the names of Ronald S. Nohr and J. Gavin MacDonald. However, for reasons not fully understood, the additive unexpectedly is not found in sufficient concentration at the surfaces of the fibers of the nonwoven web to render the web wettable until after the web has been allowed to stand for a period of time which can be for as long as about two weeks.

In general, the shear rate required by the method of the present invention will be in the range of from about 50 to about 30,000 sec$^{-1}$. Preferably, the shear rate will be in the range of from about 150 to about 5,000 sec$^{-1}$, and most preferably from about 300 to about 2,000 sec$^{-1}$.

Throughput is of importance because it affects the time the newly formed fiber or film is in a sufficiently molten or fluid state to allow migration or segregation of the additive toward the newly formed surfaces, even though throughput also affects the shear rate.

Throughput typically will be in the range of from about 0.01 to about 5.4 kg/cm/hour. Preferably, throughput will be in the range from about 0.1 to about 4.0 kg/cm.hour. The throughput most preferably will be in the range of from about 0.5 to about 2.5 kg/cm/hour.

As used herein, the phrase "molten state" does not necessarily mean "flowable". Rather, the term is used to denote a condition of the thermoplastic composition in which the additive molecules still are capable of migrating or segregating to the surface of the newly formed fiber or film. Thus, the term is somewhat imprecise and not readily subject to accurate measurement. Consequently, this composition fluidity factor preferentially is described or accounted for by the term "throughput".

The present invention is further described by the examples which follow. Such examples, however, are not to be construed as limiting in any way either the spirit or scope of the present invention. In the examples, all temperatures are in degrees Celsius and all parts are by weight unless stated otherwise.

EXAMPLE 1

Preparation of Control Spunbonded Webs

Spunbonded nonwoven webs were prepared on a pilot-scale apparatus essentially as described in U.S. Pat. No. 4,360,563, which is incorporated herein by reference.

The thermoplastic polyolefin employed was Escorene 3445 polypropylene (Exxon Chemical Americas, Houston, Tex. 77079). According to the manufacturer, the polymer has a density of 0.900 g/cc and a melt flow rate of 35 g/10 minutes.

The additive was a trisiloxane polyether, L-77, supplied by Union Carbide Corporation, Danbury, Conn. The material has the formula,

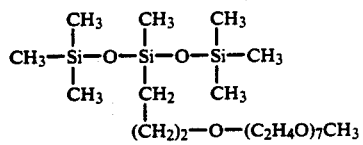

The material has a theoretical molecular weight of 602. Based on gel permeation chromatography studies (American Polymer Standards Corporation, Mentor, Ohio) relative to PDMS standards, the following average molecular weights were calculated:

| | |
|---|---|
| Weight-average molecular weight: | 557 |
| Number-average molecular weight: | 480 |
| Z-average molecular weight: | 614 |
| Polydispersity: | 1.16 |

The material contained an estimated 7.8 percent low molecular weight material, based on total peak area and main peak area comparisons, and an estimated 20-25 percent free polyether.

Additive was incorporated into the polypropylene at levels of 0.75, 0.85 and 1.0 percent by weight, respectively. In each case, the polymer and additive were simply mixed mechanically before introducing the mixture to the feed hopper of the extruder. Typically, a standard portable cement mixer was charged with 50 pounds of the polymer in pellet form. The mixer then was started and charged with the desired amount of additive. Mixing was allowed to continue for 20 minutes, after which time the mixture was removed from the mixer and stored in plastic-lined boxes.

The more significant process variables generally were as extruder temperature, 200–233°;
melt inlet temperature, 233–236 ;
throughput, 39 kg per hour;
spin head temperature, 228–233°;
pump block temperature, 231–236°;
pack temperature, 237–243 ;
pack pressure, 200 psig;
melt temperature, 223–224°

In each case, the web basis weight was about 68 g/m$^2$. The wettability of each web was estimated by placing a drop of water on the web and measuring the time required for complete penetration of the water drop into the web (referred to hereinafter as wetting time). Each web was tested with a minimum of five drops of water placed in five different locations. Consequently, wetting times are reported as ranges when significantly different wetting times among the five or more drops of water were observed. Each web was tested immediately after its formation, one minute after formation, five minutes after formation, and at five-minute intervals thereafter. The results are summarized in Table 1.

TABLE 1

| Summary of Control Spunbonding Trials | | |
|---|---|---|
| Concn. Additive | Immed. Wett. | Wettability Delay Time |
| 1.0 | No | 30 minutes |
| 0.85 | No | 30 minutes |
| 0.75 | No | 30 minutes (partially wettable) |

EXAMPLE 2

Preparation of Spunbonded Webs Having Increased Delay Periods

The procedure of Example 1 was repeated, except that the level of additive was maintained at 1.0 percent by weight, based on the amount of thermoplastic polyolefin, and either 0.3 or 1.0 percent by weight, based on the amount of thermoplastic polyolefin, of a phthalocyanine dye (Pigment SC 4402, Standridge Color Corp., Social Circle, Georgia) also was included. The results are summarized in Table 2.

TABLE 2

| Summary of Increased Delay Spunbonding Trials | | |
|---|---|---|
| Concn. Additive | Concn. Material | Wettability Delay Time |
| 1.0 | 1.0 | 7 days |
| 1.0 | 0.3 | 2 days |

Having thus described the invention, numerous changes and modifications thereof will be readily apparent to those having ordinary skill in the art without departing from the spirit or scope of the invention. For example, the compositions of the present invention also can contain fillers, delustrants, colorizers or pigments, stabilizers, and the like.

What is claimed is:

1. In a method for preparing a nonwoven web having delayed wettability, in that said web is not wettable by water upon its formation but becomes wettable thereafter without any post-formation treatment, which method comprises melting a mixture of at least one thermoplastic polyolefin and at least one additive having the general formula,

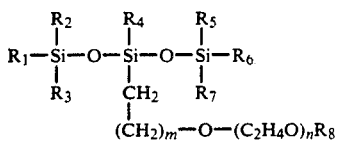

and extruding the resulting melt through a die at a shear rate of from about 50 to about 30,000 sec$^{-1}$ and a throughput of no more than about 5.4 kg/cm/hour, in which:

(A) $R_1$–$R_7$ are independently selected monovalent $C_1$–$C_3$ alkyl groups;
(B) $R_8$ is hydrogen or a monovalent $C_1$–$C_3$ alkyl group;
(C) m represents an integer of from 0 to about 5
(D) n represents an integer of from 3 to about 8;
(E) said additive has a molecular weight of from about 350 to about 700;
(F) said additive has a polydispersity of from about 1.0 to about 1.3; and
(G) said additive is present in an amount of from about 0.5 to about 1.75 percent by weight, based on the amount of thermoplastic polyolefin, which amount, if homogeneously distributed throughout the polyolefin, is not sufficient to render the polyolefin wettable by water;

the improvement which comprises including in said mixture of at least one thermoplastic polyolefin and at least one additive from about 0.1 to about 6 percent by weight, based on the amount of said thermoplastic polyolefin, of at least one material having the capacity to increase the delay period for up to about two weeks.

2. The method of claim 1, in which said thermoplastic polyolefin is polypropylene.

3. The method of claim 1, in which said material having the capacity to increase the delay period for up to about two weeks is a phthalocyanine dye.

4. The method of claim 3, in which said phthalocyanine dye is metallized.

5. The method of claim 4, in which said phthalocyanine dye is metallized with copper.

* * * * *

UNITED STATES PATENT AND TRADEMARK OFFICE
CERTIFICATE OF CORRECTION

PATENT NO. : 5,114,646
DATED : May 19, 1992
INVENTOR(S) : Ronald S. Nohr, et. al.

It is certified that error appears in the above-indentified patent and that said Letters Patent is hereby corrected as shown below:

Column 3, line 58  "weightaverage" should read --weight-average--:

Column 6, line 24  "were as" should read --were as follows:--;

Column 6, line 26  "233-236" should read --233-236*--;

Column 6, line 30  "237-243" should read --237-243*--;

Signed and Sealed this

Nineteenth Day of October, 1993

Attest:

BRUCE LEHMAN

*Attesting Officer*  *Commissioner of Patents and Trademarks*